(12) United States Patent
Fischer

(10) Patent No.: US 6,519,425 B2
(45) Date of Patent: Feb. 11, 2003

(54) IMAGE-PRODUCING METHODS AND APPARATUS

(75) Inventor: Todd A. Fischer, Boise, ID (US)

(73) Assignee: Hewlett-Packard Company, Fort Collins, CO (US)

(*) Notice: Subject to any disclaimer, the term of this patent is extended or adjusted under 35 U.S.C. 154(b) by 18 days.

(21) Appl. No.: 09/792,449

(22) Filed: Feb. 23, 2001

(65) Prior Publication Data

US 2002/0118976 A1 Aug. 29, 2002

(51) Int. Cl.$^7$ .............................................. G03G 15/00
(52) U.S. Cl. ...................................................... 399/49
(58) Field of Search ............................... 399/9, 27, 29, 399/46, 49, 60, 101, 301, 302, 308, 345; 347/116

(56) References Cited

U.S. PATENT DOCUMENTS

| 5,122,835 A | * | 6/1992 | Rushing et al. ............... 399/49 |
| 5,296,897 A | * | 3/1994 | Amemiya et al. ......... 399/49 X |
| 5,541,708 A | * | 7/1996 | Tsuruoka ...................... 399/60 |
| 5,543,896 A | * | 8/1996 | Mestha ......................... 399/49 |
| 5,937,227 A | * | 8/1999 | Wong et al. .................. 399/49 |
| 5,974,276 A | * | 10/1999 | Oogi ............................ 399/46 |
| 6,021,288 A | * | 2/2000 | Okuno et al. ............. 399/49 X |
| 6,181,892 B1 | * | 1/2001 | Fujimori ................... 399/49 X |
| 6,341,205 B1 | * | 1/2002 | Yoshino et al. ............. 399/101 |

\* cited by examiner

*Primary Examiner*—Sandra Brase

(57) ABSTRACT

Methods and apparatus are disclosed for utilizing an inter-page gap for producing calibration patches, which utilization can reduce or eliminate interruption or suspension, due to calibration, of the normal printing mode of a color laser printer. In one embodiment of the present invention, an apparatus is provided which is configured to produce at least one calibration patch within each of a plurality of successive inter-page gaps. In accordance with another embodiment of the present invention, a method is disclosed which provides for producing at least one calibration image within an inter-page gap and further includes producing at least one calibration patch within each of a plurality of successive inter-page gaps.

5 Claims, 9 Drawing Sheets

IMAGE-PRODUCING METHODS AND APPARATUS

FIELD OF THE INVENTION

This invention pertains to color laser imaging methods and apparatus and, in particular, to methods and apparatus for reducing or eliminating the interruption of normal printing capability during a calibration cycle.

BACKGROUND OF THE INVENTION

Color printing by an electrophotographic printer is achieved by first scanning a digitized image onto a photoconductor. Typically, the scanning is performed with diodes which pulse a beam of energy onto the photoconductor. The diodes can be, for example, laser diodes or light emitting diodes (LEDs). The photoconductor typically comprises a movable surface coated with a photoconductive material capable of retaining localized electrical charges. In many cases, the movable surface is in the form of a revolvable cylindrical drum.

The surface of the photoconductor is divided into small units called pixels. The photoconductor is generally configured to continuously revolve such that any given pixel is repeatedly moved past the diodes at a substantially regular cycle and at a substantially constant rate, and along a substantially fixed path relative to the diodes. Each pixel is capable of being charged to a given electrical potential, independent of the electrical charge of each surrounding pixel.

During operation of the printer, substantially all of the pixels are first charged to a base electrical charge as they move past a charging unit during each revolution of the photoconductor. Then, as the pixels move past the diodes, the beam of energy, such as a laser, is either directed at, or not directed at, each of the pixels as dictated by the digital data the laser is directed at a given pixel, the given pixel can be electrically altered by changing (typically discharging) the base electrical charge to a second electrical charge.

Thus, after passing a laser during operation of the printer, a first portion of the pixels will remain at the base electrical charge because they were not exposed to the laser, while a second portion will have a different charge because of being altered by the laser. The first and second portions of unaltered and altered pixels thus form an image on the photoconductor. One portion of pixels will attract toner, while the other portion will not, depending on various factors such as the electrical potential of the toner. That is, the unaltered pixels will either attract or not attract toner, and vice versa with regard to the altered pixels.

In most electrophotographic printing processes, the altered, or electrically discharged, pixels attract toner onto the photoconductor. In this manner, toner is selectively transferred to the image on the photoconductor formed by the electrically discharged pixels. This process is known as discharge area development (DAD). However, in some electrophotographic printing processes toner is attracted to the un-discharged (i.e., charged) pixels on the photoconductor. This latter type of electrophotographic printing is known as charge-area-development (CAD). For purposes of discussion, it will be assumed that DAD is used, although the present invention is not limited to DAD.

Once the toner has been applied to the photoconductor, the toner is then transferred to a finished product medium, such as a sheet of paper. Although the finished product medium typically comprises paper, it can also comprise other materials such as plastic, as in the case of a transparency. The transfer of toner from the photoconductor to the finished product medium can be direct, or it can be indirect using an intermediate transfer device. That is, in the direct method, the toner is transferred directly from the photoconductor to the finished product medium. In the indirect method, the toner is transferred first to an intermediate transfer device, then transferred from the intermediate transfer device to the finished product medium. The intermediate transfer device typically comprises a revolvable endless belt. During operation of the printer, the intermediate transfer device typically moves by circulating, or revolving, past the photoconductor.

After the toner is transferred to the finished product medium, it is processed to fix the toner thereto. This last step is normally accomplished by thermally heating the toner to fuse it to the finished product medium, or applying pressure to the toner on the finished product medium. Any residual toner on the photoconductor and/or the intermediate transfer device is then removed by a cleaning station, which can comprise either or both mechanical and electrical means for removing the residual toner.

A variety of methods are known for selectively attracting toner to a photoconductor. Generally, each toner has a known electrical potential affinity. As described above, selected pixels of the photoconductor can be exposed by a laser from a base potential to a given potential associated with the selected toner, and then the toner can be presented to the photoconductor so that the toner is attracted only to the selectively exposed pixels. This latter step is known as developing the photoconductor.

In some processes, after the photoconductor is developed by a first toner, the photoconductor is then recharged to the base potential and subsequently exposed and developed by a second toner. In other processes, the photoconductor is not recharged to the base potential after being exposed and developed by a selected toner. In yet another process, the photoconductor is exposed and developed by a plurality of toners, then recharged, and then exposed and developed by another toner. In certain processes, individual photoconductors are individually developed with a dedicated color, and then the toner is transferred from the various photoconductors to a transfer medium which then transfers the toner to the finished product medium. The selection of the charge-expose-develop process depends on a number of variables, such as the type of toner used and the ultimate quality of the image desired.

Image data for an electrophotographic printer (which will also be known herein as a "printer"), including color laser printers, is digital data which is stored in computer memory. The data is stored in a matrix or "raster" which identifies the location and color of each pixel which comprises an overall image. The raster image data can be obtained either by scanning an original analog document and digitizing the image into raster data, or by reading an already digitized image file. The former method is more common to photocopiers, while the latter method is more common to printing computer files using a printer. Accordingly, the invention described below is applicable to either photocopiers or printers.

Recent technology has removed the distinction between photocopiers and printers such that a single printing apparatus can be used either as a copier, a printer for computer files, or a facsimile machine. In any event, the image to be printed onto finished product media is provided to the printer as digital image data. The digital image data is then used to pulse the beam of a laser in the manner described above so that the image can be reproduced by the electrophotographic printing apparatus. Accordingly, the expression "printer" should not be considered as limiting to a device for printing a file from a computer, but should also include any device capable of printing a digitized image in the general manner described herein, regardless of the source of the image.

The image data file is essentially organized into a two dimensional matrix within the raster. The image is digitized into a number of lines. Each line comprises a number of discrete points. Each of the points corresponds to a pixel on the photoconductor. Each point is assigned a binary value relating information pertaining to its color and potentially other attributes, such as density. The matrix of points makes up the resultant digitally stored image. The digital image is stored in computer readable memory as a raster image. That is, the image is cataloged by line, and each line is cataloged by each point in the line. A computer processor reads the raster image data in line-by-line fashion, and actuates the laser to selectively expose a given pixel based on the presence or absence of coloration, and the degree of coloration for the pixel.

The method of transferring the digital raster data to the photoconductor via a laser, lasers, or LEDs, is known as the image scanning process, or the scanning process. The scanning process is performed by a scanning portion, or scanning section, of the electrophotographic printer. The process of attracting toner to the photoconductor is known as the developing process. The developing process is accomplished by the developer section of the printer. Image quality is dependent on both of these processes. Image quality is thus dependent on both the scanning section of the printer, which transfers the raster data image to the photoconductor, as well as the developer section of the printer, which manages the transfer of the toner to the photoconductor.

In the case of a typical four-color laser printer, at least one laser scanner is included in the printer and utilized to generate a latent electrostatic image on the photoconductor. Generally, one latent electrostatic image is generated for each color plane to be printed. A "color plane" generally refers to a portion of the output image which comprises only a single color of toner. In a four-color laser printer, the final output image comprises four color planes. This allows for each of four colors to be imaged first onto a photoconductor, then transferred onto an intermediate transfer device, and finally transferred from the intermediate transfer device to the finished product medium. As discussed above, in accordance with certain printer configurations, the intermediate transfer device is omitted and image is transferred directly from the photoconductor to the finished product medium.

Generally, two types of four-color laser printers exist. One type is a four-pass printer which has only a single photoconductor. Another type is an in-line printer which has four photoconductors. These two types will be discussed in further detail below. Both types of printers are generally configured to print images having four color planes. The four color planes typically printed, and which are generally considered as necessary to generate a relatively complete palate of colors, are yellow, magenta, cyan and black. That is, the typical color printer is provided with toners in each of these four colors. However, it is understood that some printer configurations employ fewer than four color planes while other printer configurations employ more than four color planes. Some printers have the capability of printing one color on top of another on the same pixel, so as to generate a fuller palate of finished colors.

In a typical scanning process, a laser is scanned from one edge of the photoconductor to the opposite edge while being selectively pulsed in accordance with the image data file. That is, the laser scans transversely across the photoconductor, following a row of pixels. As the laser scans along the row of pixels, it is selectively pulsed a pixel-by-pixel basis. That is, for each pixel in a row, the laser is either directed at the pixel, or not directed at it. The scan of the laser in this manner causes a line of point which make up the digital image to be transferred from the raster onto the photoconductor. As the photoconductor moves past the laser, the laser advances to the next row of pixels, and the next line of points from the digital image is scanned by the laser onto the photoconductor. The image data is thus scanned onto the photoconductor in a pixel-by-pixel and line-by-line basis until the complete image is transferred to the photoconductor.

The side-to-side scanning action of each laser is traditionally accomplished using a dedicated multi-faceted rotating polygonal mirror at which a stationary laser is aimed. The rotation or the mirror causes the reflected laser beam to be scanned across the photoconductor. at a unique relative lineal position from a first edge to a second edge of the photoconductor. As the mirror rotates to an edge of the polygon between facets, the reflected laser reaches the edge of the photoconductor. When the laser is reflected off of the next facet as it rotates into position, the laser is essentially reset to the first edge of the photoconductor to begin scanning a new line onto the advancing photoconductor.

In a color laser printer apparatus, there are several parameters that must be maintained in order to consistently produce color images of acceptable quality. One of these parameters is the registration, or alignment, of the different color planes. That is, each laser and photoconductor should be aligned with respect to the other lasers and photoconductors such that a given point in the raster image is associated with a single common point on the surface of the finished product medium. A printer having a color plane registration which is "off" will produce a blurry image, or an image with colors not representative of the original image.

Each laser and its associated components (i.e., rotating mirror, optical elements, and deflector mirror) is typically mounted in a precision housing to keep the components in relative fixed position with respect to one another. Assuring registration of the lasers requires aligning the four housings within the printer itself. As environmental conditions within the printer change (e.g., temperature), this alignment can change. Mechanical vibration or shock to the printer can also allows the lasers to become misaligned.

Since only partial alignment of the laser beams with respect to one another can be achieve by aligning the housings which contain the scanning assemblies, typical color printers are provided with an integral, on-board calibration system to allow for factory and ex-factory alignment of the lasers. One component of the calibration system is a plurality of color plane sensors to sense color plane registration. The sensors are provided to detect shifts in color planes in both the side-to-side scanning direction (the "scan" direction), as well as in the direction of advance of the photoconductor surface (i.e., the "process" direction). The sensors can provide a feedback to the scanning system and corrections, or adjustments, can be made to reposition the laser beams using various known electrical and mechanical methods.

In addition to color plane registration, color density is another parameter which must be maintain in order to produce accurate images. By "color density" I mean the propensity of an area of applied toner to reflect light energy as a function of the amount of toner applied per unit area. Relatively high color density is generally associated with colors that can be described as dark, while relatively low color density is generally associated with colors that can be described as light. In order to faithfully reproduce an original image, the color density of the toners, as applied to the photoconductor, should be such that the brightness and contrast of the colors appear in the reproduced image as they are intended. Another related parameter that can be important to achieving a high quality reproduced image is faithful reproduction of the spectrum of the colors which are in the original image. That is, a color characterized by a given wavelength in the original image should preferably have essentially the same wavelength in the reproduced image.

Many factors, including atmospheric conditions, and variations in the toners themselves, can affect the spectral aspects of the finished product. This phenomenon is sometimes referred to as printer "drift." Thus, it is desirable to provide a mechanism to compensate for toner variations caused by printer drift. Such a mechanism can attempt to correct spectral variances by varying the mix of toners applied to a pixel, as well as the quantity of each toner applied. To determine when a color density or spectrum is accurately imaged, the calibration system of a printer can be further provided with color density sensors and color spectrum sensors which can detect the characteristics of a color (e.g., brightness, contract, gamma, and spectral characteristics).

In order to assist in determining whether the printer is reproducing the original image within acceptable limits, the calibration system is provided with a reference calibration image. The reference calibration image can comprise various patches of toner (calibration patches), each having associated characteristics of known specifications. These known specifications of the reference calibration image can be employed as base references against which the characteristics of reproduced images can be compared. For example, the reference calibration image can comprise various calibration patches, each having known color wavelengths and color densities against which actual reproduced calibration patches can be compared.

To use the reference calibration image, the calibration system can cause the printer to initiate a calibration cycle. Typically a calibration cycle is initiated by one of several possible events. For example, a calibration cycle can be initiated by turning the printer on or by the replacement of a toner cartridge. The calibration cycle can also be initiated by a timer or page counter, or the like. That is, the calibration cycle can be initiated by the passage of a preset interval of time or can be initiated when the number of printed pages reaches a specified number.

During the calibration cycle, the printer suspends the normal print mode and attempts to exactly reproduce the reference calibration image which can comprise a plurality of various calibration patches. After the calibration image is reproduced by the printer, a sensor or sensors measure the various characteristics of the reproduced calibration image, such as color density. The measured characteristics of the reproduced calibration image are then compared to the known characteristics of the reference calibration image.

If a discrepancy is detected between the reproduced calibration image and the reference calibration image, and if the discrepancy is outside of acceptable limits, the calibration system can attempt to adjust various parameters of the printer in an effort to minimize the discrepancies. For example, if a color density is determined to be inaccurate in the reproduced calibration image, the printer can adjust the application of the affected toner. Thus, the calibration image can also be described as a "test image" which is used to test whether the printer is producing images that are within acceptable specifications.

The reference calibration image is typically stored in computer readable memory which is preferably resident within the printer itself. When the calibration cycle is initiated, either automatically or as directed by a user, the printer retrieves the reference calibration image from the memory and then reproduces it. Generally, the calibration image is reproduced on one of the surfaces which normally bear output images during normal production. These surfaces can include photoconductors and intermediate transfer devices as well as the finished product medium.

For example, the calibration image can be reproduced on an intermediate transfer device, if the printer is so equipped. Once the calibration image is reproduced, it can then be moved past the calibration sensor(s) to detect and measure the various characteristics of the patch. Generally, the printer is provided with a cleaning station which is configured to remove the calibration patches from surfaces such as the intermediate transfer device after the characteristics of the patches are measured by the sensor(s).

Once the characteristics of the patches are measured, the calibration sensor(s) transmit the measured characteristics of the reproduced calibration image, in the form of output signals, to a processing unit (preferably resident within the printer). The output signals from the calibration sensor(s) can be stored temporarily in computer resident memory. The output signals are then compared to the reference calibration image to determine if the reproduced calibration image varies from the reference calibration image, and if so, by how much.

The processing unit can be further provided with an calibration algorithm to cause the calibration image to be produced and to determine what correction(s), if any, to the printer are required in order to bring the reproduced imaged within acceptable limits of accuracy. After any adjustments are made, the printer can be caused to reproduce the reference calibration image a second time in order to determine whether the corrective adjustments have brought the various components of the imaging apparatus into conformance so as to produce an image within the specifications of the reference calibration image. However, in an effort to minimize the time and cost associated with the calibration interval, calibration cycles commonly reproduce the calibration image only once during each calibration cycle.

As mentioned above at least two types of four-color laser printers are known. Two common types are the four-pass type and the in-line type. The four-pass type is generally provided with a single photoconductor and a single laser/mirror scanner system. The four-pass is also generally provided with a movable intermediate transfer device, commonly in the form of an endless belt which circulates, or revolves, past the photoconductor.

In operation, each of the four color planes (typically black, yellow, cyan, and magenta) which make up an output image is consecutively developed on the photoconductor and completely deposited on the intermediate transfer device. That is, as a first color plane is developed on the photoconductor, it is deposited in its entirety on the intermediate transfer device as the device makes a complete first revolution, past the photoconductor.

The intermediate transfer device then begins a second revolution past the photoconductor during which the second color plane is developed on the photoconductor and deposited in its entirety on the intermediate transfer device in registered alignment with the first color plane. This process is repeated in like manner for the third and fourth color planes until all four color planes have been deposited on the intermediate transfer device so as to build-up the completed image thereon. It is important that each succeeding color plate is deposited exactly "on top of" the previous color plate. That is, each succeeding color plate is superimposed, or deposited in registration with, the previous color plate. device, it is then transferred to a sheet of finished product medium. A characteristic of the four-pass printer is that the size of output image produced thereby is limited by the length of the intermediate transfer device, since the entire output image is produced in its entirety on the intermediate transfer device before the image is transferred to the finished product medium.

By comparison, a typical four-color, in-line type of printer is provided with four lasers and four in-line photoconductors. Each of the lasers is paired with one of the photoconductors. Also, each of the four colors of toner (typically black, yellow, cyan, and magenta) corresponds exclusively to one of the laser/photoconductor pairs. Like the four-pass type of printer, the in-line type generally has only one intermediate transfer device, which is also commonly in the form of an endless belt. However, unlike the multi-pass type of printer, the in-line type of printer does not require an intermediate transfer device for operation. Thus, in-line printers without intermediate transfer devices can be configured to transfer toner, in the form of an image, directly from the photoconductors to the finished product medium.

During operation of a typical in-line printer, each of the four color planes is developed on its own corresponding photoconductor and then deposited on the intermediate transfer device or, as in an alternative configuration, directly on the finished product medium. Generally, all of the color planes of a given image produced by an in-line printer are produced concurrently, as opposed to one-at-a-time as in a four-pass printer. By "concurrently," I mean the occurrence of a group of two or more events, each event having a duration over a time interval, and wherein at least a portion of the time interval of each event overlaps that of every other event in the group, and further wherein each event does not necessarily occur simultaneously.

Also, whereas the four-pass printer employs a step-by-step process to "build up" each output image one color plane at a time, the in-line printer employs a continuous process to produce the output image. That is, in an in-line printer having an intermediate transfer device, all four color planes of a given portion of the output image are deposited on the intermediate transfer device and transferred to the finished product medium in less than one revolution of the intermediate transfer device.

Unlike the case of four-pass printer configuration, the size of the image produced by the in-line printer is not limited by the size of the intermediate transfer device, since the image production is a continuous process. Since both the four-pass design and in-line design of the four-color printing apparatus are known in the art, further details regarding the configuration, construction, and operation of each need not be discussed.

Moving to FIG. 1, a schematic side elevation diagram of a typical prior art four-color laser electrophotographic imaging apparatus ("printer") 10 is depicted. The printer 10 comprises an intermediate transfer device 24. As is seen, the intermediate transfer device 24 can be configured as a movable, endless belt which is supported by a set of substantially parallel rollers 26. As can also be seen, the intermediate transfer device 24 can move, or revolve, in the direction "A."

The prior art printer 10 also comprises an image-producing portion 12 which can sit astride the intermediate transfer device 24 as shown. The printer 10 can also include an indexing device 14 which can be configured to assist in moving and positioning sheets of finished product medium "M" as the sheets feed through the printer 10 in the direction "B." The printer 10 can further comprise a transfer module 16 and a cleaning station 18, both of which are more fully described below. A sensor 20 can be positioned as shown and is also described in greater detail below. A viewpoint 50 is shown, from which the intermediate transfer device 24 can be observed over an elapsed time period, and which will be discussed in further detail below.

The prior art printer 10 can be configured as a four-pass design, or as an in-line design, among other designs. Therefore, the image-producing portion 12 can alternatively comprise a single laser/photoconductor as in the case of a four-pass configuration, or a plurality of laser/photoconductors as in the case of an in-line configuration. That is, for purposes herein, the image-producing portion 12 is meant to include any device which is configured to develop an image from toner and deposit the image onto the intermediate transfer device 24.

Although not specifically shown herein, it is understood that other configurations of prior art printers exist, such as those which deposit an image directly onto a finished product medium rather than onto an intermediate transfer device. However, the principles of operation of such other prior art printers are similar to those of the prior art printers depicted and discussed herein.

As is seen in FIG. 1, the image-producing portion 12 is shown in normal print mode and has produced a first completed output image P1 on the intermediate transfer device 24. The first output image P1 is depicted as being transferred onto a sheet of finished product medium "M," which has moved in the direction "B" past the indexing device 14. The transfer module 16 causes the first output image P1 to become substantially transferred from the intermediate transfer device 24 to the sheet of finished product medium "M" as the sheet continues to move in the direction "B."

The sheet of finished product medium "M," on which the first output image P1 is transferred, can then continue on to a fuser (not shown) which can fuse the first output image to the medium. Meanwhile, the image-producing portion 12 has begun to produce a second output image P2 on the intermediate transfer device 24. Another sheet of finished produce medium "M" moves in direction "B" and into position to accept the second output image P2.

As is further seen in FIG. 1, a space "S" can be maintained between successive sheets of finished product medium "M." The space "S" is typical for all printer apparatus and can aid in the proper movement and positioning of the sheets relative to the output images P1, P2 which, in turn, can provide for proper final alignment of the output images P1, P2 on the sheets. Apparatus and methods of positioning output images P1, P2 on finished product medium "M" in conjunction with printer apparatus are known in the art and need not be discussed herein.

FIG. 2 shows an additional view of the schematic side elevation diagram depicted in FIG. 1. In FIG. 2 it is seen that the printer 10 has begun to perform a calibration cycle. The image-producing portion 12 has started to produce a calibration image comprising a series of calibration patches 28 on the intermediate transfer device 24. A sheet of finished product medium "M" is held in position at the indexing device 14 and is not allowed to proceed to the transfer module 16 because the normal print mode is suspended during the calibration cycle. As the calibration patches 28 move past the sensor 20, the sensor can detect various characteristics of the calibration patches such as color density and the like.

During the calibration cycle, the sheet of finished product medium "M" can remain in position at the indexing device as shown without moving past the transfer module 16. Because no finished product medium "M" is available at the transfer module 16, the calibration patches remain on the intermediate transfer medium 24 as they pass the transfer module. Continuing past the transfer module 16, the calibration patches 28 reach the cleaning station 18 where the calibration patches are removed from the intermediate transfer device 24.

The removed calibration patches 28 are typically collected and deposited in a waste hopper 19. During the calibration cycle, only calibration patches 28 are produced by the image-producing portion 12. That is, during the calibration cycle of the prior art printer 10 no output images P1, P2 are produced. Typical elapsed times of prior art calibration cycles can be from one (1) to four (4) minutes or longer.

Turning now to FIG. 3, an time-lapse diagram is shown of the intermediate transfer device 24 as observed from the viewpoint 50 (shown in FIGS. 1 and 2) over a given time interval from time reference T1 to time reference T4. That is, FIG. 3 depicts what would be seen by an observer viewing the intermediate transfer device 24 from the viewpoint 50 during a time interval that starts at a time reference T1 and ends at a time reference T4.

It is noted that the diagram depicted in FIG. 3 reveals the output images P1, P2, P3, P4 that would normally be hidden from view by the finished product medium "M." However, as is evident, the output images P1, P2, P3, P4 are included for clarity, and the perimeters thereof are delineated by dashed lines which indicate the "hidden" status of the output images.

At a first time reference T1 an observation of the intermediate transfer device 24 begins. Time elapses in the direction "T." The first output image P1 is produced and transferred to a sheet of finished product medium "M" shortly before the first time reference T1. Shortly after the first time reference T1, the first output image P1 passes before the viewpoint 50 (shown in FIGS. 1 and 2). Shortly after the first output image P1 is observed, the second output image P2 is observed, having also been transferred onto a sheet of finished product medium "M."

A study of FIG. 3 will reveal that the sheets of finished product medium "M" onto which the first and second output images P1, P2 are transferred, are separated by an inter-page gap "G." By "inter-page gap" I mean an area which is on a surface, and which is situated either between two consecutive output images that concurrently reside on the intermediate transfer device, or between the edges of a single output image that wholly resides on the intermediate transfer device, and within which area no toner is to be transferred to any finished product medium.

By "surface," I mean any surface which is configured to support an output image or a calibration patch. By "output image," I mean any image, group of images, or portion of an image, including a color plane, or color planes, comprising toner and intended to be transferred, to the exclusion of any other image, to a single piece of finished product medium. The inter-page gap "G" corresponds to the space "S" (shown in FIG. 1) which is maintained between each of two consecutive sheets of finished product medium "M."

At a second time reference T2 a plurality of calibration patches 28 is observed beginning to pass the viewpoint 50 (shown in FIGS. 1 and 2) which passage indicates the beginning of a calibration cycle. At a third given time reference T3 the plurality of calibration patches 28 is observed to end, which indicates the end of the calibration cycle. A period of up to four minutes between the time references T2 and T3 can be typical for the elapsed time of a calibration cycle of prior art printing apparatus. The calibration patches 28 can comprise individual calibration patches of each of the toners available. That is, during a complete prior art calibration cycle, all four toners of a four-color printer 10 are included in the calibration patches 28.

Also, as seen, all calibration patches 28 that are produced during a prior art calibration cycle are produced between the same two consecutive output images, which in this case are P2, P3. As time elapses past time reference T3, the third output image P3 is observed to pass the viewpoint 50 (shown in FIGS. 1 and 2), followed by the passing of a fourth output image P4. The third and fourth output images P3, P4 are separated by an inter-page gap "G" which also corresponds to a space "S" which separates the sheets of product medium "M" onto which the third and fourth output images P3, P4 are transferred.

Turning now to FIG. 4, a flow diagram is depicted which shows the basic steps that can be performed in a prior art calibration cycle. The first step S1 is to initiate the calibration cycle. The second step S2 can be to stop the in-feed of the finished product medium "M" (shown in FIGS. 1–3) so as to suspend the normal print mode. The next step S3 is to begin producing the calibration patches 28 (shown in FIGS. 2 and 3), followed by the fourth step S4 which is to begin detecting and measuring the characteristics of the calibration patches. An example of a characteristic that would be measured in the fourth step S4 is the color density. The next step S5 is to finish producing the calibration patches 28 (shown in FIGS. 2 and 3), which can be followed by the sixth step S6 of finishing the detection and measurement of the characteristics of the calibration patches.

When the characteristics of the calibration patches 28 (shown in FIGS. 2 and 3) are measured, the next step S7 can be to compare the measured characteristics of the calibration patches to the characteristics of the reference calibration image (not shown). The eighth step S8 can be to query whether adjustments should be made to the printer 10 (shown in FIGS. 1 and 2) based on the comparison performed in the previous step S7. If the determination is made to make such printer adjustments, the method can proceed to the ninth step S9 which is to make the adjustments.

Once the adjustments are made, the method can proceed to the tenth step S10 which is to allow in-feed of the finished product medium "M" (shown in FIGS. 1–3). If the query of the eighth step S8 results in a determination not to make printer adjustments, the method can skip the ninth step S9 and proceed directly to the tenth step S10. After the tenth step S10, the calibration cycle can be ended at the final step S11. It is evident from FIG. 4 that the prior art calibration method excludes the production of normal printer output.

That is, during the prior art calibration cycle, normal output images P1, P2, P3, P4 (shown in FIG. 3) are not produced.

As previously mentioned, calibration cycles of prior art printers can typically have elapsed times of between one (1) and four (4) minutes, or longer, depending on the configuration of the printer among other factors. During the calibration cycle, the normal print mode of the printer is suspended, or interrupted, until the calibration cycle is either completed or aborted. That is, during the calibration cycle, the printer is unavailable for producing normal output images. In high-demand or time-sensitive printer applications, such suspension of the normal print mode can be very undesirable for obvious reasons. It is therefore desirable to find a way to reduce or eliminate the unavailability of printers caused by the production of calibration images.

SUMMARY OF THE INVENTION

The invention includes methods and apparatus for utilizing an inter-page gap to produce calibration patches therein, thus substantially reducing or eliminating the interruption of the normal print mode of color laser printers caused by the calibration cycle.

In accordance with a first embodiment of the present invention, an imaging apparatus in accordance with the present invention is generally configured as an in-line type imaging apparatus and includes an intermediate transfer device. The apparatus comprises a computer memory which contains an algorithm for defining an inter-page gap on the intermediate transfer device. The algorithm can cause the apparatus to produce at least one calibration patch within the inter-page gap. The algorithm can also be configured to determine the number of calibration patches to produce within a given inter-page gap and to dictate the size of the given inter-page gap based on the number of calibration patches to be produced therein.

In accordance with a second embodiment of the present invention, an imaging apparatus is generally configured as a four-pass type and comprises an intermediate transfer device. The apparatus comprises a computer memory that includes an algorithm which is configured to determine the size of an inter-page gap that is located between the ends-of an output image which resides wholly on the intermediate transfer device. The algorithm can also cause at least one calibration patch to be produced within the inter-page gap. The number of calibration patches to be produced within the gap can be determined by the algorithm and based on the size of the inter-page gap.

In accordance with a third embodiment of the present invention, an imaging apparatus is generally configured without an intermediate transfer device. The apparatus comprises a computer memory that includes an algorithm which is configured to determine the size of an inter-page gap that is located on a photoconductor. The algorithm can also cause at least one calibration patch to be produced within the inter-page gap. The number of calibration patches to be produced within the gap can be determined by the algorithm and based on the size of the inter-page gap.

In accordance with a fourth embodiment of the present invention, a method of calibrating a color laser printer is disclosed. The method includes producing at least one calibration patch within at least one inter-page gap. The method can also include defining a plurality of successive inter-page gaps and producing at least one calibration patch within each of the plurality of gaps. Furthermore, the method can include dictating the size of each of the plurality of successive inter-page gaps and can also include dictating the size of each of the plurality of successive inter-page gaps based on the number of calibration patches to be produced within the gap.

In accordance with a fifth embodiment of the present invention, another method of calibrating a color laser printer is disclosed. The method includes determining the size of an inter-page gap based on the length of the surface on which the inter-page gap is defined. The size of the inter-page gap can also be determined based on the length of the output image to be produced. The method can also include producing at least one calibration patch within the inter-page gap and during each of a number of revolutions of the surface, wherein a different calibration patch is produced within, and selectively removed from, the inter-page gap during each revolution.

DETAILED DESCRIPTION OF THE INVENTION

Figure 1:
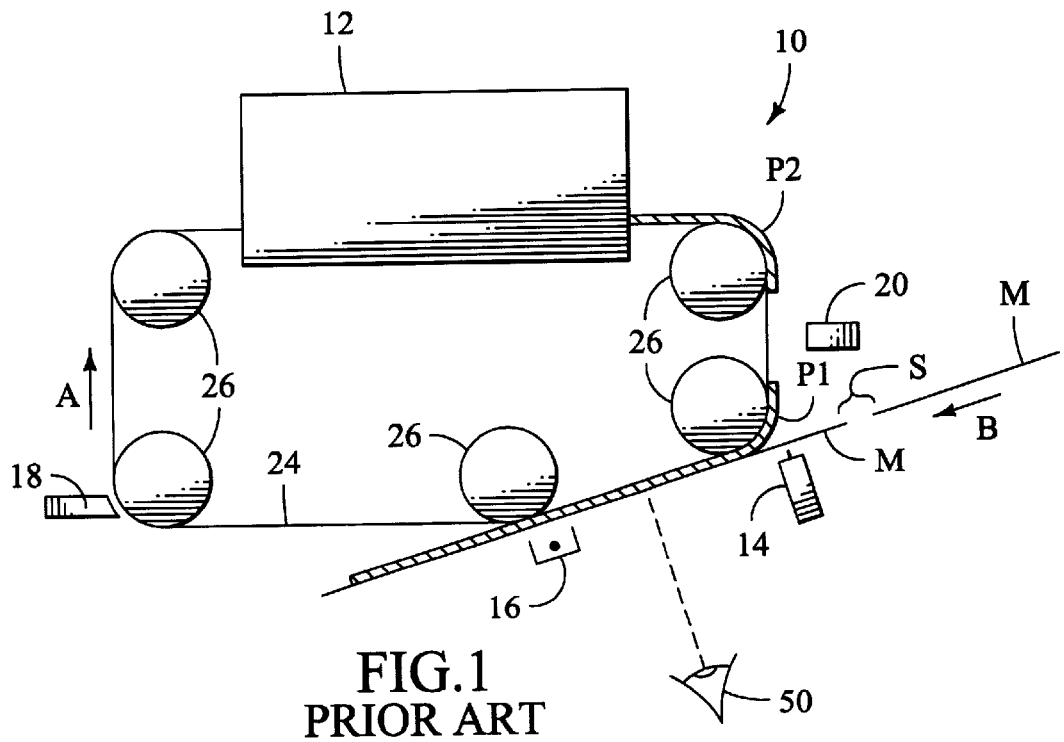
FIG. 1 is a side elevation schematic diagram of a prior art imaging device depicting a normal print mode.
Figure 2:
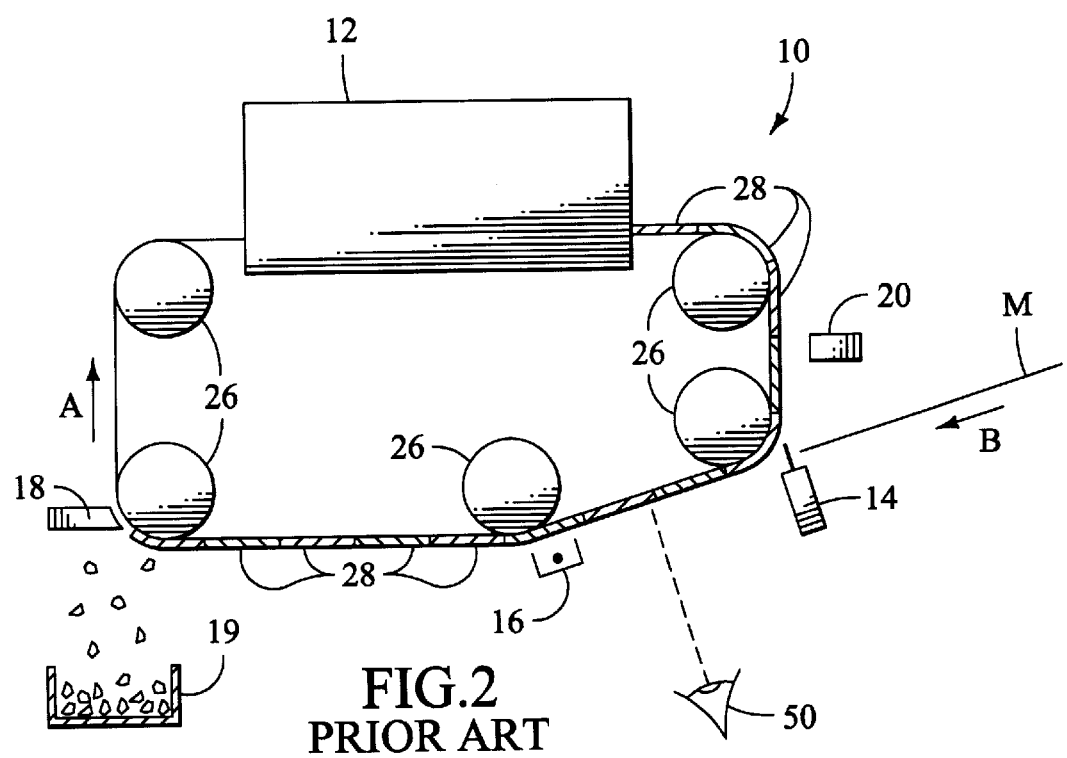
FIG. 2 is a side elevation schematic diagram of a prior art imaging device depicting a calibration cycle.
Figure 3:
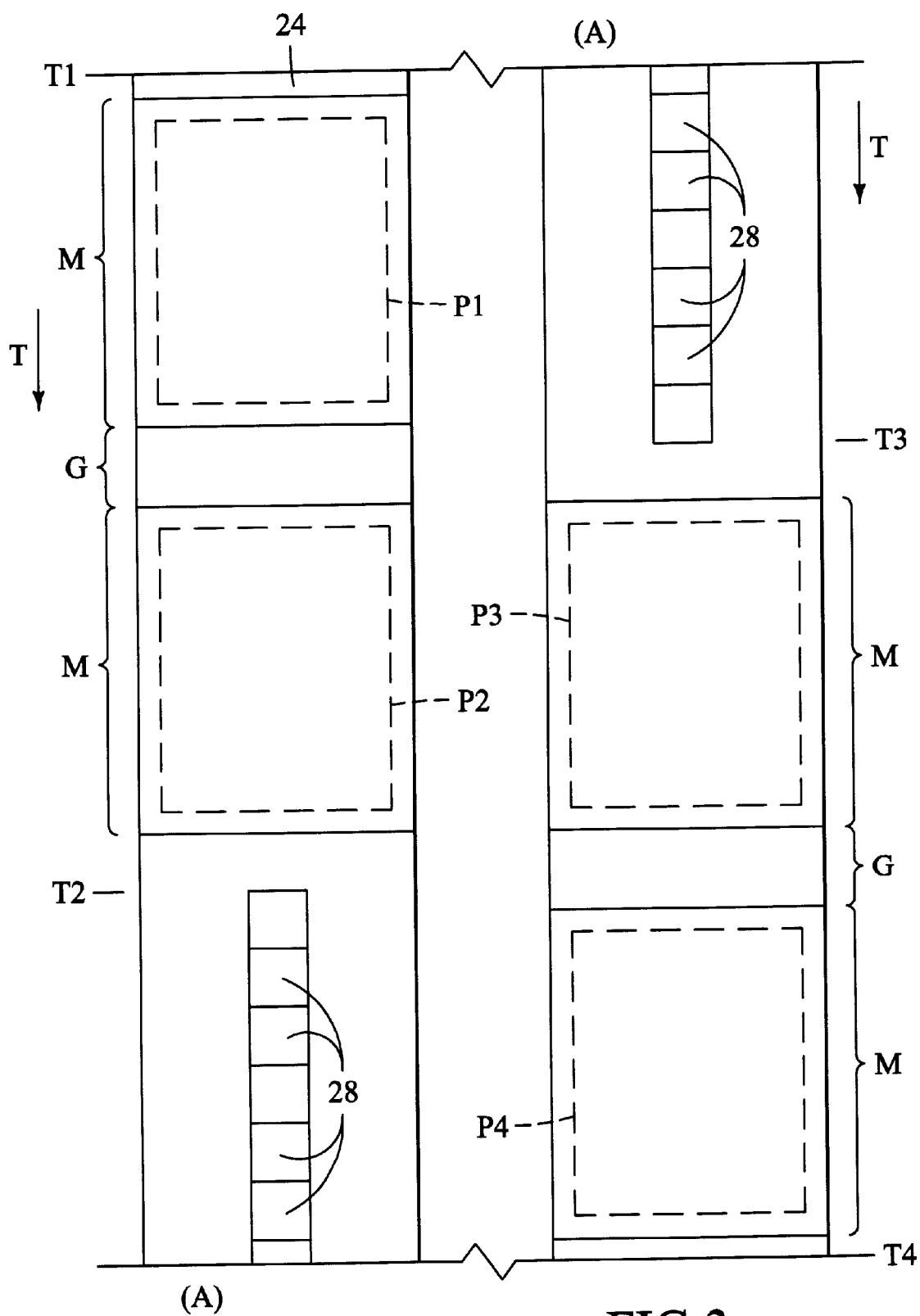
FIG. 3 is a time lapse diagram showing a view of the intermediate transfer device over an interval of time.
Figure 4:
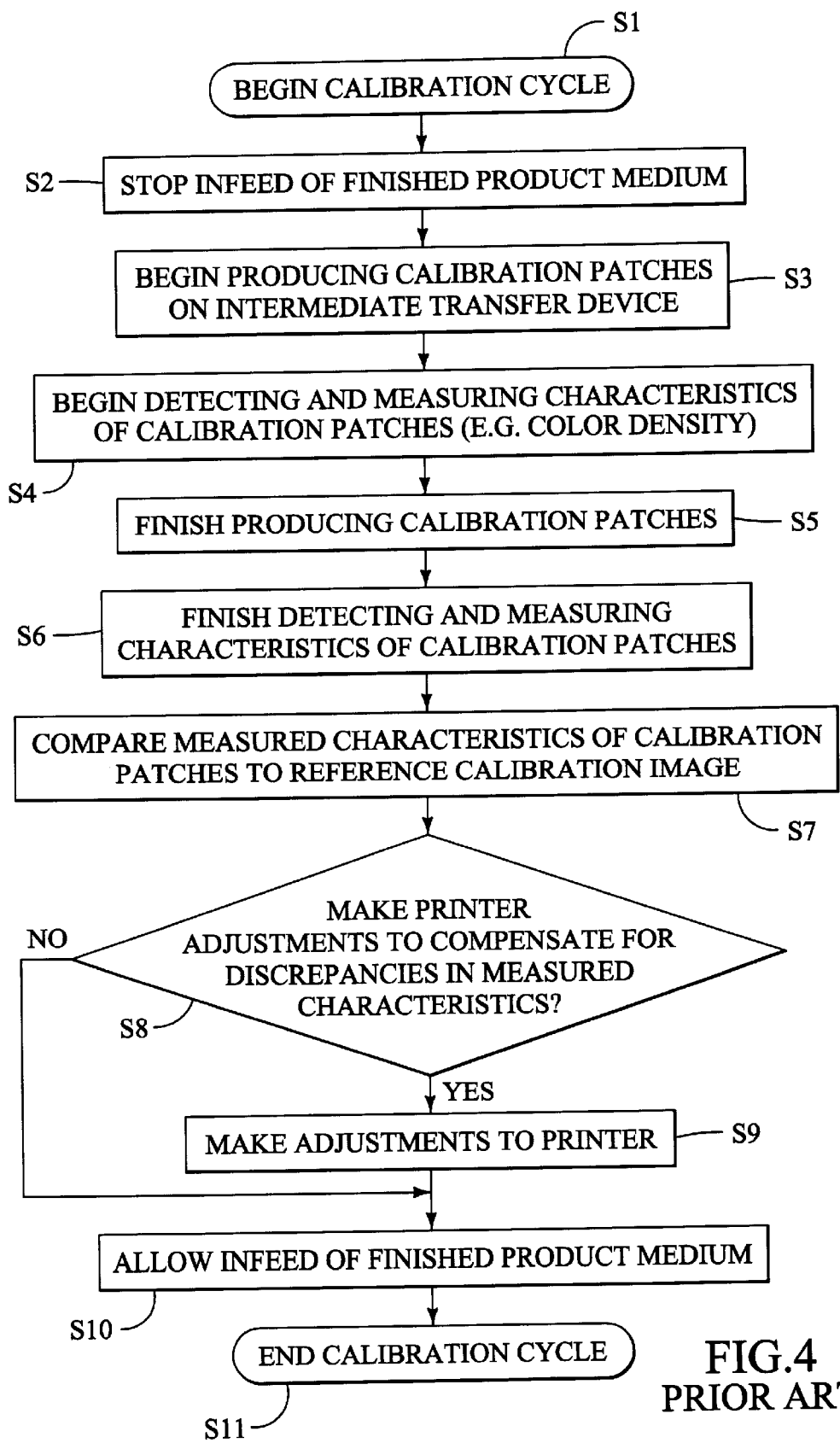
FIG. 4 is a flow diagram depicting the typical steps of a prior art calibration cycle.

The invention includes methods and apparatus for more efficiently performing a calibration cycle in a color laser printer by utilizing an inter-page gap for producing calibration patches therein. Such a utilization of the inter-page gap can reduce or eliminate the interruption or suspension of output production normally associated with performing a calibration cycle in prior art devices. The invention involves the production of at least one calibration patch within at least one inter-page gap. In at least one embodiment of the present invention, the size of the inter-page gap can be dictated and varied in accordance with the number of calibration patches to be printed within the gap. In another embodiment, at least one calibration patch can be produced within, and removed from, the inter-page gap on each revolution of the intermediate transfer device during a multi-pass production of a single output image.

The apparatus of the present invention is described alternately herein as an "imaging device," and a "printer" among other terms. By "imaging device" and "printer" I mean an imaging device that comprises at least one surface which is configured to have at least one toner deposited thereon so as to form both images and calibration patches. The surface can be a photoconductor, an intermediate transfer device, or finished product medium.

The surface can also move the deposited toner, in the form of a calibration patch, past a sensor or sensors that detect and measure various characteristics of the calibration patch. The measured characteristics can be employed to determine if the apparatus is producing images having accurate characteristics. This can be accomplished by comparing the measured characteristics to a reference calibration image.

One example of an imaging device which is within the scope of the present invention is a color laser printer. Another example is a color photocopier. However, the invention should not be considered as limited to these examples, but is understood in include all apparatus, and related methods, for producing an image using toner deposited on an intermediate transfer device.

Methods for comparing a reproduced calibration image to a reference calibration image are well known in the art, and need not be discussed further herein. Moreover, the methods and apparatus for making adjustments to an in-line imaging device based on a comparison of the calibration product and the calibration image are well known in the art and need not be discussed or described further.

An apparatus in accordance with the present invention includes an image producing portion, a surface on which an image can be produced, and can also include a digital memory which stores a calibration algorithm. The image-producing portion is configured to deposit at least one toner onto the surface as the surface moves past the image-producing portion. The calibration algorithm is configured to cause the image-producing portion to produce calibration patches on the surface in accordance with the present invention. The surface can be either a photoconductor, an intermediate transfer device, or a finished product medium. These and other methods and apparatus in accordance with the present invention will now be more fully described.

Figure 5:
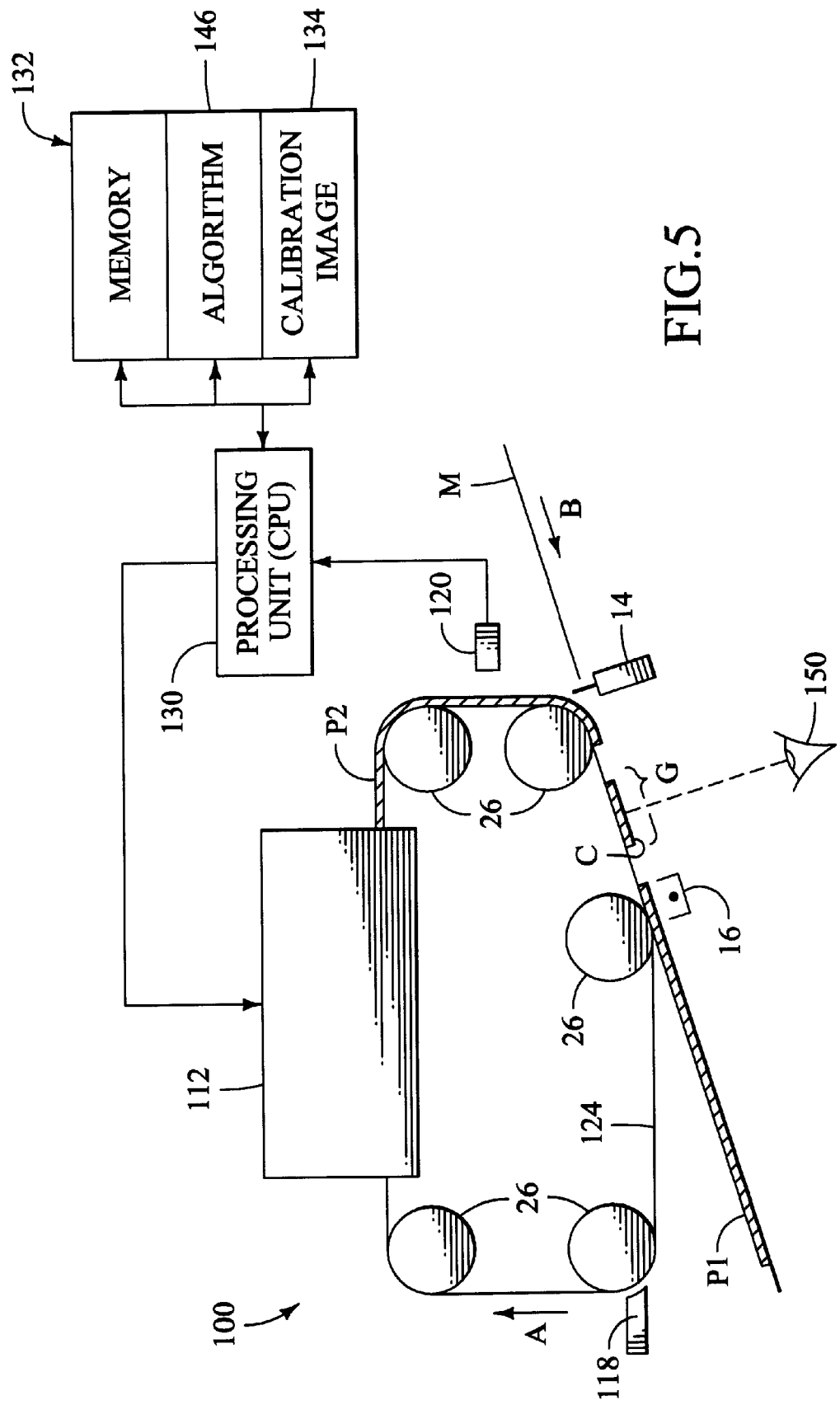
FIG. 5 is a side elevation schematic diagram of a printer apparatus in accordance with a first embodiment of the present invention.

With reference to FIG. 5, an image-producing apparatus, or printer, 100 in accordance with a first embodiment of the present invention is depicted in a schematic side elevation diagram. As is seen, the apparatus 100 can be similar to the prior art apparatus 10 in that the apparatus 100 can include an image-producing portion 12. Like the prior art printer 10, the apparatus 100 can also include a surface 124 which can be configured as a revolvable endless belt supported by a plurality of substantially parallel rollers 26 as depicted. The surface 124 can be configured to function in the manner of an intermediate transfer device 124, and can be configured to move, or revolve, in the direction "A."

The apparatus 100 can further include an indexing device 14, a transfer module 16, and a sensor 20, all of which can be configured to function in a manner similar to those of the prior art printer 10 as described above. The operation of the apparatus 100 is similar to that described above with respect to the prior art apparatus 10, except that the apparatus 100 is configured with an in-line type of image-producing portion 112.

That is, the apparatus 100 is configured to have the capability of producing all four color planes on the intermediate transfer device 124 in a substantially concurrent manner. The apparatus 100 can also include a cleaning station 118, the operation of which is described below. Moreover, the viewpoint 150 is shown, from which the surface 124 can be observed over a time interval. The relevance of the viewpoint 150 will become apparent in later discussion.

The apparatus 100 can also include a readable memory 132 which can be a computer readable memory such as an integrated circuit. The readable memory 132 can have a reference calibration image 134 which is different from reference calibration images of the prior art, and can also have a calibration algorithm 146 which is different from calibration algorithms of the prior art. The algorithm 146 can cause the image-producing portion 112, via the processing unit 130, to produce at least one calibration patch (not shown) on the surface 124. The calibration patch can be based on the reference calibration image 134. As is seen, the apparatus 100 can be configured to produce a first output image P1 and a second output image P2 on the surface 124 in a manner similar to that described above for the prior art printer 10.

From a study of FIG. 5 it is seen that the first output image P1 can be transferred to a finished product medium "M," such as a sheet of paper or the like, with the aid of the transfer module 16. As the first output image P1 moves in the direction "B," another sheet of finished product medium "M" is fed into position behind the first output image P1. A space "S," which is shown and described for FIG. 1 above, can be maintained between successive sheets of finished product medium "M" as the sheets feed through the printer apparatus 100. As is seen, the apparatus 100 can cause the second output image P2 to be produced on the intermediate transfer device 124. The apparatus 100 can also cause at least one calibration patch "C" to be produced on the surface 124 and within an inter-page gap "G" which can be defined by the algorithm 146 between consecutive first and second output images P1, P2.

The algorithm 146 can define the inter-page gap "G" to be a given size which is directly proportional to the number of first calibration patches "C" which are to be produced within the inter-page gap. That is, the algorithm 146 can dictate the size of the inter-page gap "G" by controlling the time intervals between the production of successive output images P1, P2, and the time interval between the in-feed of consecutive sheets of finished product medium "M."

Moreover, the algorithm 146 can cause the size of the inter-page gap "G" to be a relatively small size to accommodate a relatively small number of calibration patches "C." Conversely, the inter-page gap "G" can be a relatively large size for a relatively large number of calibration patches. For example, the algorithm 146 can cause a relatively small inter-page gap "G" to be defined, within which a single calibration patch "C" can be produced.

The algorithm 146 can define a plurality of successive inter-page gaps "G" each of which are substantially equal in size. In that case, the algorithm 146 can cause the same number of calibration patches "C" to be produced within each of the plurality of successive inter-page gaps "G." Each of the plurality of successive inter-page gaps "G" can comprise a single toner and each can be of a different color intensity. Alternatively, each of the plurality of calibration patches can comprise a different toner, and can also comprise more than one toner.

The algorithm 146 can also define a plurality of successive inter-page gaps "G" each of which are substantially different in size. In that case, the algorithm 146 can cause a different number of calibration patches "C" to be produced within each of the plurality of successive inter-page gaps "G." Each succeeding inter-page gap "G" can be made to contain a greater number of calibration patches "C" than the previous inter-page gap. Alternatively, each succeeding inter-page gap "G" can be made to contain a smaller number of calibration patches than the previous inter-page gap.

As an alternative to dictating the size of the inter-page gap "G," the algorithm 146 can allow the size of the inter-page gap to be determined solely as a function of the production of output images P1, P2. That is, the algorithm 146 can merely passively determine the size of a "naturally" occurring inter-page gap "G," and then determine how many, if any, calibration patches "C" will fit within the inter-page gap.

In this manner, the rate of production of output images is not affected by the production of calibration patches "C" within the inter-page gap "G." It is understood that the size of the inter-page gap "G" can be affected by any of several "naturally occurring" production factors. For example, the size and complexity of the image(s) which are produced on each page can be a factor in determining the size of the inter-page gap "G." Specifically, highly complex images can comprises relatively large amounts of data which can result in an increase in the size of the inter-page gap "G" as the data is processed and readied to be transformed into an output image.

Still referring to FIG. 5 it is evident that the first output image P1 is depicted as having been nearly completely transferred to a sheet of finished product medium "M" with the aid of the transfer module 16. The second output image P2 is being readied for transfer onto another sheet of finished product medium "M" which moves into position in the direction "B" as the surface 124 revolves in the direction "A." It is evident that, because no finished product medium "M" is available within the inter-page gap "G," the calibration image "C" will pass by the transfer module 16 while remaining on the surface 124.

Thus, all calibration patches "C" which are within an inter-page gap "G" will pass by the transfer module 16 and will not be transferred to finished product medium "M." Alternatively, the transfer module 16 can be caused to be deactivated whenever an inter-page gap "G" passes. As is evident, all calibration patches "C" which are within an inter-page gap "G" will not be removed from the surface 124 and will continue on to a cleaning station 118 which can remove the calibration patches from the surface 124.

The apparatus 100 can also include a sensor 120 which is supported in relation to the surface 124 so as to detect and measure various characteristics of the calibration patches "C" as the patches pass the sensor on the revolving surface. The sensor 120 can convert various measurements taken from the calibration patches "C" to signals which can be sent to the processing unit 130. The signals can then be used to compare the calibration patches "C" to the reference calibration image 134.

Figure 7:
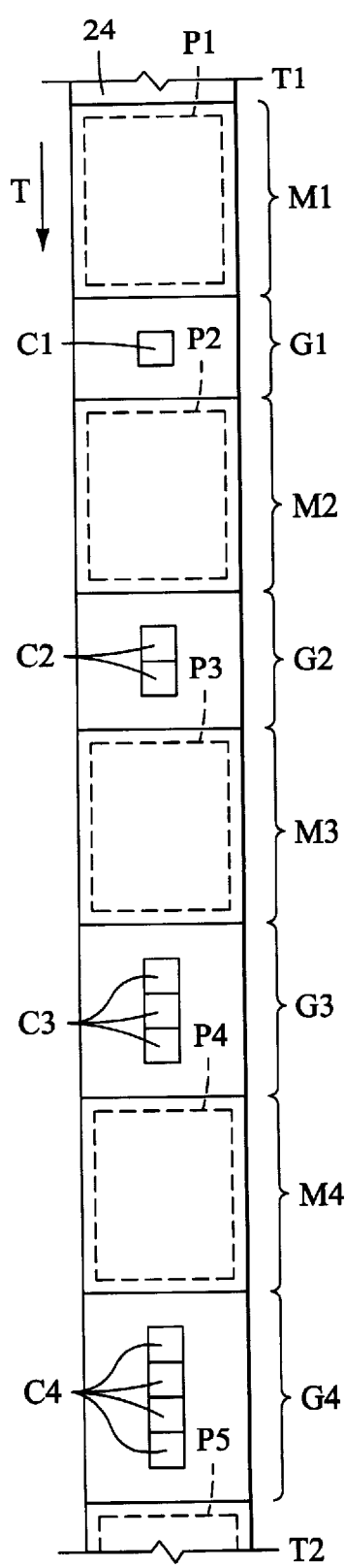
FIG. 7 is a time lapse diagram showing a view of the surface of the apparatus in accordance with the first embodiment of the apparatus depicted in FIG. 5.

Moving to FIG. 7, a time lapse diagram is shown of the surface 124 of the apparatus 100 as observed from the viewpoint 150 (shown in FIG. 5) from time reference T1 to time reference T2. Time elapses in the direction "T." As is seen, the algorithm 146 (shown in FIG. 5) can cause the printer 100 (shown in FIG. 5) to produce a plurality of output images P1, P2, P3, P4 in succession on the surface 124. Each of the output images P1, P2, P3, P4 can be transferred onto a respective sheet of finished product medium M1, M2, M3, M4.

As a result of the production of the output images P1, P2, P3, P4, a succession of inter-page gaps G1, G2, G3, G4 are defined on the surface 124, wherein one inter-page gap separates two adjacent sheets of finished product medium M1, M2, M3, M4. The size of the inter-page gaps G1, G2, G3, G4 can be determined solely as a function of the production aspects of the output images P1, P2, P3, P4. That is, the size of the inter-page gaps G1, G2, G3, G4 can be determined solely by such factors as the speed at which the output images P1, P2, P3, P4 can be produced as well as the minimum spacing required between consecutive sheets of finished product medium "M."

Alternatively, the size of the inter-page gaps G1, G2, G3, G4 can be dictated as a function of the number of calibration patches C1, C2, C3, C4 to be produced within each inter-page gap. That is, the size of any given inter-page gap G1, G2, G3, G4 can be dictated solely by the number of calibration patches C1, C2, C3, C4 to be produced therein, regardless of any other factors, assuming the minimum requirements for the production of output images are met. The algorithm 146 can cause the printer 100 to produce at least one calibration patch C1, C2, C3, C4 within each respective inter-page gap G1, G2, G3, G4.

The number of calibration patches C1, C2, C3, C4 which are produced within a given inter-page gap G1, G2, G3, G4 can be a function of the size of the inter-page gap. By "size of the inter-page gap" G1, G2, G3, G4, I mean the distance between successive sheets of finished product medium "M" as shown. As an example, a single first calibration patch C1 can be produced within a relatively small first inter-page gap G1. As a further example, a plurality of second calibration patches C2 can be produced within a relatively larger second inter-page gap G2.

The algorithm 146 can cause the printer 100 to define consecutive inter-page gaps G1, G2, G3, G4 of varying sizes according to the number of calibration patches C1, C2, C3, C4 to be produced therein. For example, a first inter-page gap G1 can be defined so as to be relatively small, since only a single first calibration patch C1 is produced therein. Alternatively, a succeeding second inter-page gap G2 can be defined so as to be larger than the preceding first inter-page gap G1, since a plurality of second calibration patches C2 is produced therein.

The calibration algorithm 146 can also be configured to cause the printer 100 to produce a plurality of calibration patches C2, C3, C4 within at least one respective inter-page gap G2, G3, G4, wherein all the calibration patches within an inter-page gap comprise a single toner. For example, a plurality of third calibration patches C3 can be produced within a third inter-page gap G3. The plurality of third calibration patches can comprise a single toner.

Each of a plurality of calibration patches C1, C2, C3, C4 within each respective inter-page gap G1, G2, G3, G4 can be of a different color density. For example, each of the plurality of third calibration patches C3 within the third inter-page gap G3 can comprise a single toner and can each be of a differing color density. Alternatively, each of a plurality of calibration patches C2, C3, C4 within a respective inter-page gap G2, G3, G4 can comprise a single toner of a different color. For example, each of a plurality of fourth calibration patches C4 within a fourth inter-page gap G4 can comprise one each of a single toner of, for example, black, yellow, cyan, and magenta.

Figure 8:
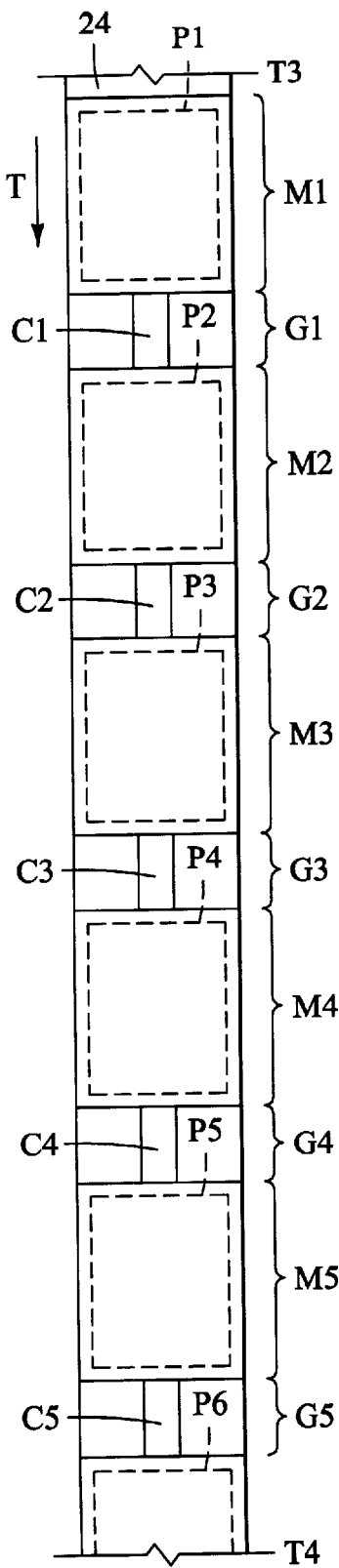
FIG. 8 is a time lapse diagram showing another view of the surface of the apparatus in accordance with the first embodiment of the apparatus depicted in FIG. 5.

Moving to FIG. 8, another time lapse diagram is shown of the surface 124 of the apparatus 100 as observed from the viewpoint 150 (shown in FIG. 5). The diagram in FIG. 8 is shown from time reference T3 to time reference T4. As is seen, the calibration algorithm 146 (shown in FIG. 5) can cause a succession of output images P1, P2, P3, P4, P5, P6 to be produced on the surface 124, and can also cause the output images to be transferred to a sheet of finished product medium "M."

A succession of inter-page gaps G1, G2, G3, G4, G5 can be defined between the output images P1, P2, P3, P4, P5, P6 so as to substantially equal in size. The succession of substantially equally sized inter-page gaps G1, G2, G3, G4 can occur solely as a function of factors pertaining to the production of the output images P1, P2, P3, P4, or can be dictated by the algorithm as a function of the number of calibration patches C1, C2, C3, C4, C5 as discussed above. That is, the inter-page gaps G1, G2, G3, G4, G5 can all be substantially the same size as the result of naturally occurring production of the output images P1, P2, P3, P4, or as the result of the algorithm 146 forcing the size of each inter-page gap to be substantially the same.

At least one calibration patch C1, C2, C3, C4, C5 can be produced within each inter-page gap G1, G2, G3, G4, G5, respectively during a calibration cycle. As is seen, each inter-page gap G1, G2, G3, G4, G5 can contain an equal number of respective calibration patches C1, C2, C3, C4, C5. Each of a plurality of successive calibration patches C1, C2, C3, C4, C5 in successive inter-page gaps G1, G2, G3, G4, G5, respectively, can comprise the same toner and can be of different color densities.

For example, all of the calibration patches C1, C2, C3, C4, C5 can comprise a first toner. However, each of the calibration patches C1, C2, C3, C4, C5 can be of a different color density. Alternatively, each of the plurality of successive calibration patches C1, C2, C3, C4, C5 can comprise a different toner. For example, a first calibration patch C1 within a first inter-page gap G1 can comprise only a first toner. A second successive calibration patch C2 within a second successive inter-page gap G2 can comprise only a second toner and so on.

Figure 6:
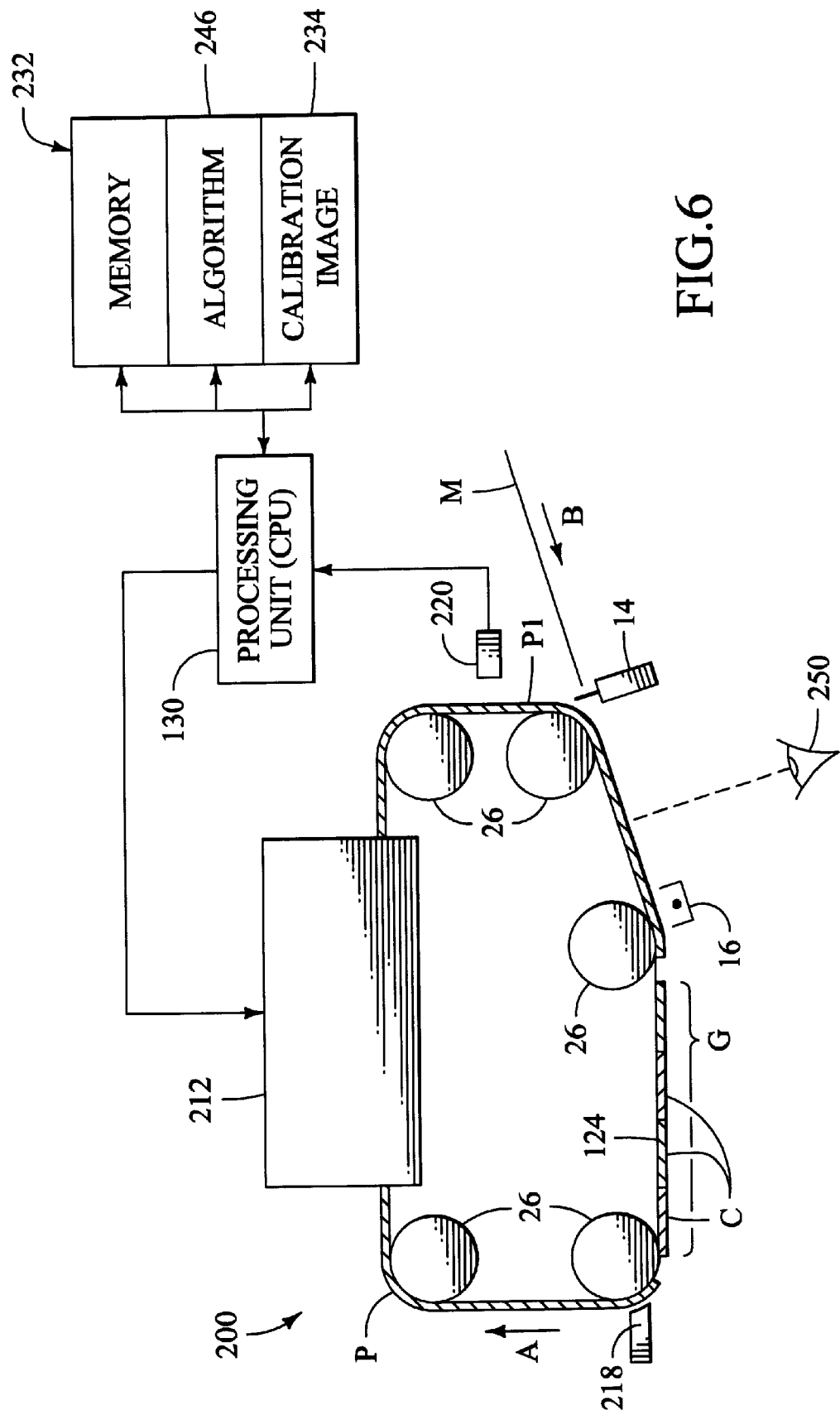
FIG. 6 is a side elevation schematic diagram of a printer apparatus in accordance with a second embodiment of the present invention.

Now referring to FIG. 6, a schematic side elevation diagram is shown of the apparatus 200 in accordance with a second embodiment of the present invention. As is seen, the apparatus 200 is similar to the apparatus 100 which is described for FIG. 5 above. That is, the apparatus 200 comprises a surface 124 which can be configured to function as an intermediate transfer device in the form of an endless belt which is supported by a plurality of substantially parallel rollers 26, and which can revolve in the direction "A."

Also, the apparatus 200 can comprise an indexing device 14 and a transfer module 16, both of which function in manners similar to those described with regard to FIG. 5 above. The apparatus 200 can also comprise a processing unit 130. The processing unit 130 can comprise a readable memory 232 which contains an algorithm 246 and a reference calibration image 234, both of which can be different than those of the apparatus 100 described above.

The apparatus 200 also comprises an image-producing portion 212 which is configured to produce output images on the surface 124 in the manner of a four-pass design which is described above. That is, the image-producing portion 212, when producing an output image on the surface 124, deposits a single color plane "P" during each of four complete revolutions of the surface. As depicted in FIG. 6, only one color plane "P" has been deposited on the surface 124.

Generally, a completed output image will comprise multiple color planes deposited one at a time on the surface 124 and in registration with one another. During the deposition of the color planes "P" on the surface 124, the finished product medium "M" is prevented from feeding through the apparatus 200 in order to prevent the incomplete output image from being transferred onto the medium. When the output image is completely formed on the surface 124, it is then transferred to a sheet of finished product medium "M", which can feed through the printer apparatus 200 in the direction "B."

A study of FIG. 6 will reveal that an inter-page gap "G" can be defined between the ends of a color plane comprising a toner "K" which is shown to wholly reside on the surface 124. As is evident, the size of the inter-page gap "G" on the apparatus 200 is dependent upon the length of the surface 124 as well as the length of the sheet of finished product medium "M" onto which the completed output image will be transferred. That is, the inter-page gap "G" is approximately equal to the difference between the length of the surface 124 and the length of the sheet of finished product medium "M."

The algorithm 246 can be configured to determine the size of the inter-page gap "G" on the apparatus 200 by calculating the difference between the length of the surface and the sheet of finished product medium "M" as described above. The algorithm 246 can also be configured to determine the number of calibration patches "C" that will fit into the inter-page gap "G." The algorithm 246 can further be configured to then cause at least one calibration patch "C" to be produced within the inter-page gap "G." The algorithm 246 can base the number of calibration patches "C" to be produced on the size of the inter-page gap "G."

The cleaning station 218 can be configured to remove both the color plane comprising the toner "K" and the calibration patches "C" from the surface, as well as any residual toner. However, the cleaning station 218 can also be configured to selectively remove only the calibration patches "C" from the revolving surface 124 without removing any color plane therefrom. That is, the cleaning station 218 can be configured as a movable blade. As a calibration patch "C" passes the cleaning station 218, the blade can be selectively moved against the moving surface 124 so as to scrape, or otherwise remove, the calibration patch from the surface.

Conversely, when a color plane comprising toner "K" passes the cleaning station 218, the blade can be selectively moved away from the surface 124, wherein the passing color plane remains thereon. The configuration of the cleaning station 218 as described above allows the apparatus 200 to produce a different calibration patch "C", or a different plurality of calibration patches, within the inter-page gap "G" during each revolution of the surface 124 as a complete output image (not shown) is formed thereon.

For example, during an initial revolution of the surface 124, a color plane comprising the toner "K" can be deposited onto the surface. The algorithm 246 can cause at least one calibration patch "C" comprising the first toner to be produced within the inter-page gap "G." Characteristics of the calibration patch "C" comprising the first toner can then be detected and measured by the sensor 220 as the calibration patch moves past the sensor. During the first revolution of the surface 124, the cleaning station 218 does not remove the color plane comprising the toner "K."

During the initial revolution of the surface 124, the cleaning station 218 can be caused by the algorithm 246 to selectively remove the calibration patch "C" after the sensor 220 detects and measures various characteristics of the calibration patch. The removal of the calibration patch "C" on the first revolution of the surface 124 can leave the inter-page gap "G" clear on a subsequent revolution. Thus, on each-of several subsequent revolutions of the surface 124, an additional color plane comprising a different toner can be deposited on the surface 124 in substantial registration with previously deposited color planes. Also, with each new color plane, a new calibration patch can be deposited within the inter-page gap "G."

Figure 9:
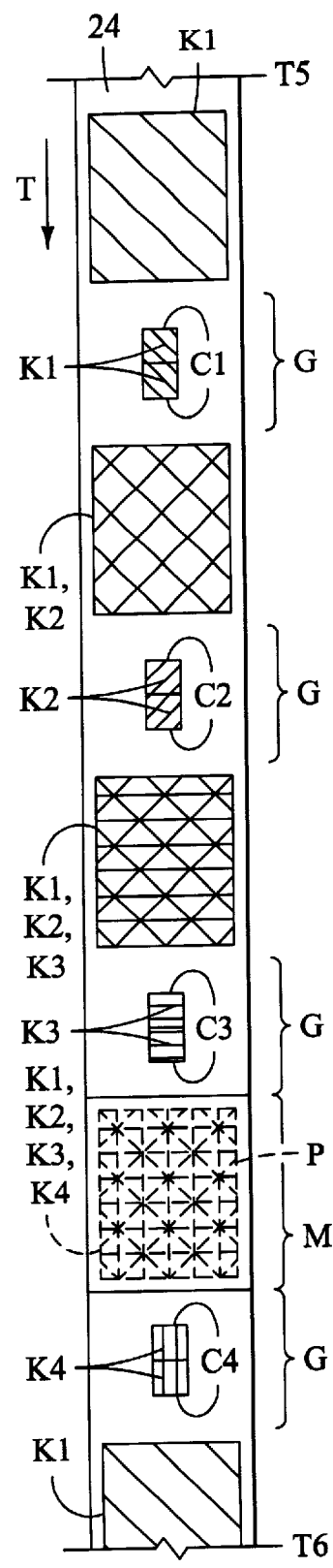
FIG. 9 is a time lapse diagram showing a view of the surface of the apparatus in accordance with the second embodiment of the apparatus depicted in FIG. 6.

Moving now to FIG. 9, a time lapse diagram is shown of the surface 124 of the apparatus 200 of FIG. 6, as observed from the viewpoint 250 (shown in FIG. 6). The time lapse diagram of FIG. 9 is shown from time reference T5 to time reference T6. As is seen, on a first revolution of the surface 124, a color plane comprising a first toner K1 can be produced on the surface. Following the production of the color plane comprising the first toner K1, at least one first calibration patch C1 can be produced within an inter-page gap "G." The first calibration patch(es) C1 can also comprise the first toner K1.

On a second revolution of the surface 124, a color plane comprising a second toner K2 can be deposited on the surface 124 in substantial registration with the color plane comprising the first toner K1. Also, during the deposition of the color plane comprising the second toner K2, the first calibration patch(es) C1 can be selectively removed from the surface 124 by selective activation of the cleaning station 218 (shown in FIG. 6). Following the deposition of the color plane comprising the second toner K2 on the surface 124, at least one second calibration patch C2 can be produced on the surface 124 and within the inter-page gap "G." The second calibration patch(es) can comprise the second toner K2.

On a third revolution of the surface 124, a color plane comprising a third toner K3 can be deposited on the surface 124 in substantial registration with the color planes comprising the first and second toners K1, K2. Also, during the deposition of the color plane comprising the third toner K3, the second calibration patch(es) C2 can be selectively removed from the surface 124 by selective activation of cleaning station 218 (shown in FIG. 6), as in the case of the first calibration patch(es) C1.

At least one third calibration patch C3, comprising the third toner K3, can be produced within the inter-page gap "G." It is noted that the finished product medium "M" would not be observed during the first three revolutions of the intermediate transfer device 124, because the medium does not feed through the printer 200 of FIG. 6 until the completed output image is transferred to the finished product medium.

On a fourth revolution of the surface 124, a color plane comprising a fourth toner K4 can be deposited on the surface 124 in substantial registration with the color planes comprising the first, second, and third toners K1, K2, K3 to complete the image. During the deposition of the color plane comprising the fourth toner K4, the third calibration patch (es) C3 can be selectively removed from the surface 124 by selective activation of the cleaning station 218 (shown in FIG. 6) and replaced by at least one fourth calibration patch C4 within the inter-page gap "G." The fourth calibration patch(es) can comprise the fourth toner K4. An output image "P" now comprising the first, second, third and fourth toners K1, K2, K3, K4 can then be transferred to a sheet of finished product medium "M." The fourth calibration patch(es) C4 can then be removed from the intermediate transfer device 124 by the cleaning station 218.

It is understood that the relative order of the calibration patches C1, C2, C3, C4 and the color planes comprising various toners K1, K2, K3, K4 can be reversed in accordance with the present invention. That is, in the alternative, the at least one first calibration patch C1 can be deposited on the surface 124 prior to the deposition of the color plane comprising the first toner K1. Thus, before the color plane comprising the first toner K1 is completely deposited on the surface 124, the cleaning station 218 (shown in FIG. 6) can remove the at least one first calibration patch C1 from the surface after the characteristics of the first calibration patch are detected and measured by the sensor 220 (shown in FIG. 6). Likewise, immediately following the completion of the deposition of the color plane comprising the first toner K1 on the surface 124, the at least one second calibration patch C2 can be deposited on the surface.

Figure 6A:
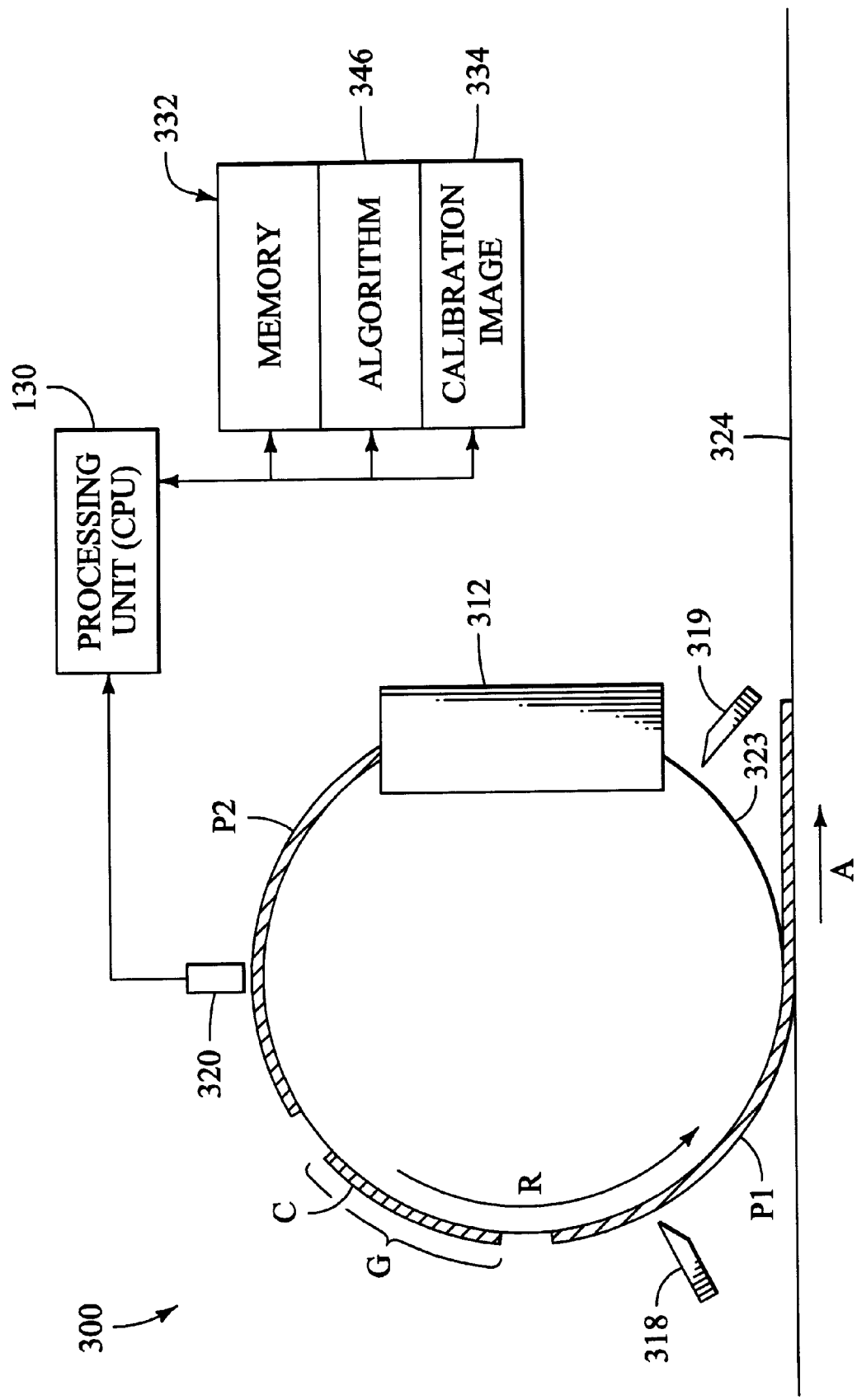
FIG. 6A is a side elevation schematic diagram of a printer apparatus in accordance with a third embodiment of the present invention.

Moving to FIG. 6A, a schematic side elevation diagram is shown of the apparatus 300 in accordance with a third embodiment of the present invention. As is evident, the apparatus 300 is configured to function in a manner similar to those of the apparatus 100 and 200 described above for FIGS. 5 and 6. That is, the apparatus 300 comprises an image-producing portion 312 which can comprise a laser/scanner device (not shown) as well as at least one toner-deposition device (not shown). The apparatus 300 can also comprise a surface 323 which is configured to function in the manner of a photoconductor. That is, the surface 323 can be configured as a photoconductive surface that is substantially in the form of a rotatable drum which is rotatable in the direction "R."

The image-producing portion 312 and the surface 323 operate in conjunction with one another to produce at least a first image P1 and a second image P2 on the surface as shown. An inter-page gap "G" can be defined on the surface 323 between to consecutive images P1, P2. The image-producing portion 312 and the surface 323 also operate in conjunction with one another to produce at least one calibration patch "C" on the surface and within the inter-page gap "G."

The apparatus 300 can further comprise a secondary surface 324, onto which the first and second images P1, P2 can be transferred. The secondary surface 324 can be in the form of an intermediate transfer device which can be configured to move in the direction "A." The function and operation of intermediate transfer devices has been described above. Alternatively, the secondary surface 324 can be in the form of finished product medium, the manner of which is also described above. That is, the apparatus 300 can be alternatively configured to transfer at least a first image P1 and a second image P2 onto either an intermediate transfer device, or directly onto a sheet of finished product medium.

The apparatus 300 can also include a sensor 320 that is configured to function and operate in a manner similar to those of sensors 120 and 220 which are included in the apparatus 100 and 200, respectively, and which are described above (shown in FIGS. 5 and 6, respectively. That is, the sensor 320 is configured to detect and measure at least one characteristic of the calibration patch "C" as the calibration patch is moved past the sensor on the surface 323.

The apparatus 300 also includes a cleaning station 318 that is configured to function and operate in a manner similar to those of cleaning stations 118 and 218 which are included in the apparatus 100 and 200, respectively, and which are described above. That is, the cleaning station 318 is configured to remove the calibration patch "C" which is produced on the surface 323 and within the inter-page gap "G" while leaving the first and second images P1, P2 on the surface.

A secondary cleaning station 319 can be located as shown relative to the surface 323 and the secondary surface 324. The secondary cleaning station 319 can be identical in every aspect to the cleaning station 318 except for its location. The secondary cleaning station 319 can be included in the apparatus 300 in place of, or in addition to, the cleaning station 318. The secondary cleaning station 319 functions to clean residual toner from the surface 323 after the output images P1, P2 have been transferred from the surface 323 to the secondary surface 324. The secondary cleaning station can also function to remove the calibration patch "C" from the surface 323 in the case wherein the calibration patch remains on the surface 323 until after the output images P1, P2 are transferred from the surface 323 to the secondary surface 324.

The apparatus 300 can include a processing unit 130 which can be the same as those of the apparatus 100 and 200 which are described above (shown in FIGS. 5 and 6 respectively). The apparatus 300 can also include a readable memory 332 which can be a computer readable memory such as an integrated circuit and which can be configured to function and operate in a manner similar to those of the computer readable memories 132 and 232 of the apparatus 100 and 200, respectively.

The readable memory 332 can include a reference calibration image 334 which is different from the reference calibration images of the prior art. The apparatus can also include an algorithm 346 which is different than those of the prior art. The reference calibration image 334 and algorithm 346 can be configured to be utilized in a manner similar to those of the apparatus 100 and 200, respectively, which are described above and which are depicted in FIGS. 5 and 6, respectively.

It is understood that the configuration, function, and operation of the apparatus 300 is similar to the configuration, function, and operation of the apparatus 100 and 200, which are described above, with the exception that the surface 323 of apparatus 300 is configured differently than the surface 124 of apparatus 100 and 200. Namely, the surface 323 of the apparatus 300 is generally configured as a rotatable drum, while the surface 124 of the apparatus 100 and 200 is generally configured as a revolvable, endless belt.

Figure 10A:
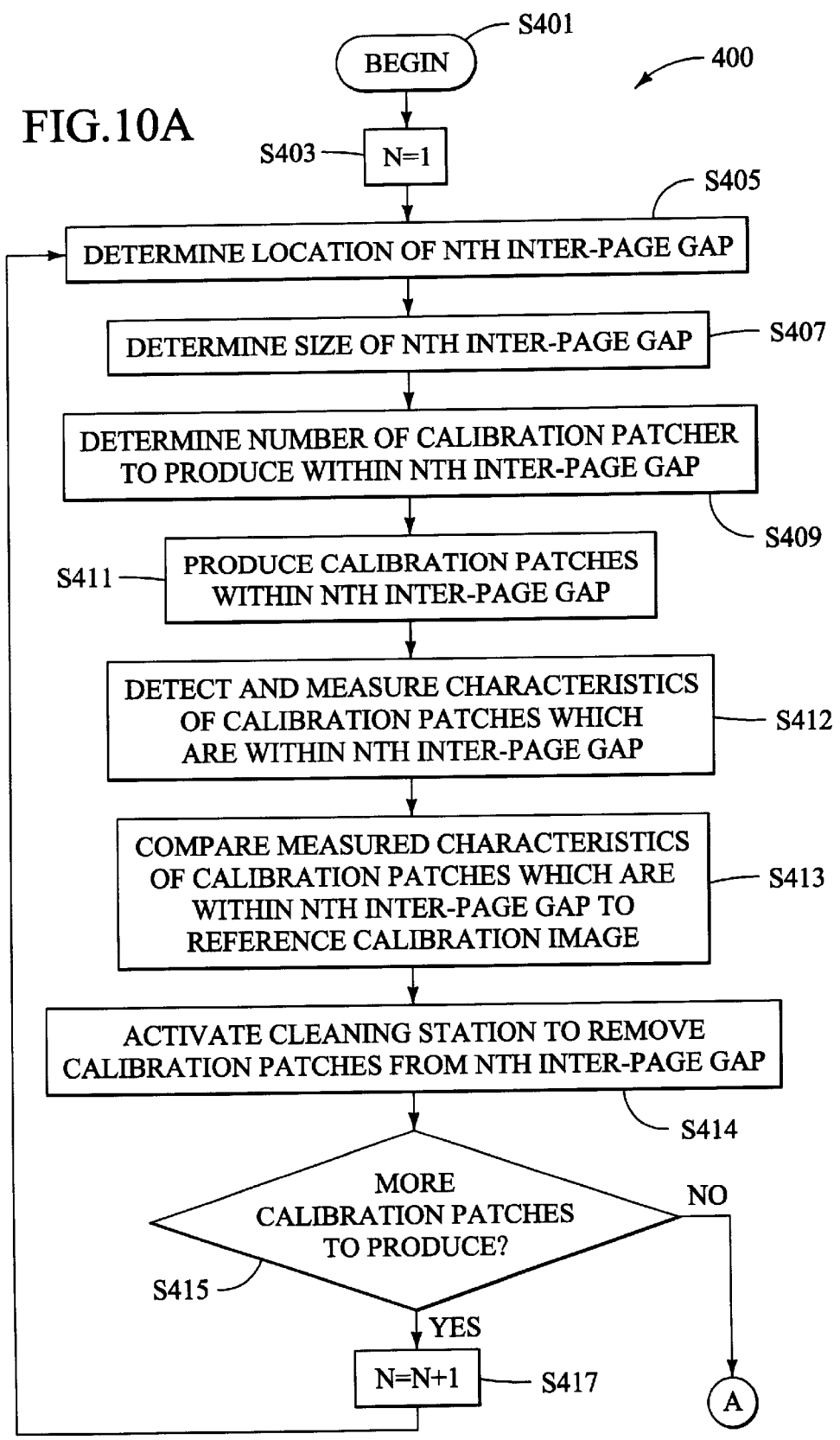
FIG. 10A is the first half of a flow diagram depicting the steps of a method in accordance with an embodiment of the present invention.
Figure 10B:
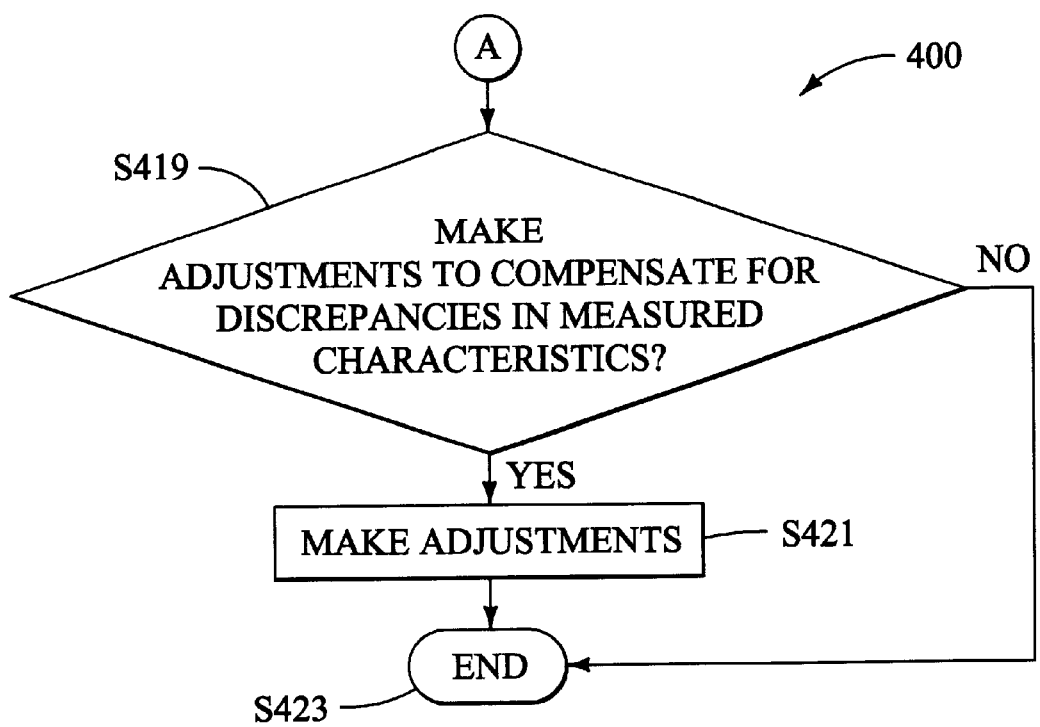
FIG. 10B is the second half of the flow diagram depicted in FIG. 10A.

FIGS. 10A and 10B depict a flow diagram 400 which represents one possible algorithm, or sequence of operational steps, for calibrating a laser printer using any of the apparatus in accordance with the present invention of which three embodiments are described above. The algorithm represented by FIGS. 10A and 10B can be executed by the processing unit 130 (shown in FIGS. 5, 6 and 6A). In step S401, the flow diagram begins. It is noted that the step S401 can take place during the production of output images.

In the next step S403, a counter is set to a value of one (1). In step S405, the location of the Nth inter-page gap is determined. The step S405 can be accomplished, for example, by accessing and analyzing an algorithm which causes the output images to be produced. In step S407, the size of the Nth inter-page gap is determined, and in the following step S409, the number of calibration patches to be produced within the Nth inter-page gap is determined.

In accordance with step S411, at least one calibration patch is produced within the Nth inter-page gap. Then, in step S412, characteristics of the at least one calibration patch are detected and measured. These characteristics can include, for example, the color density of the calibration patch. In step S413, the measured characteristics of the calibration patch are compared to a reference calibration image.

In accordance with step S414, the cleaning station is activated to remove the calibration patches from the Nth inter-page gap. Step S415 queries whether there are more calibration patches to be produced. If the answer to step S415 is "yes," then the next step is that of S417 which adds a value of one (1) to the counter, so that the value of the counter is now two (2). From step S417, the flow diagram 400 leads back to step S405, whereupon the steps which follow S405 are repeated as described above.

If, on the other hand, the answer to the query of step S415 is "no," then the flow diagram 400 proceeds to step S419, which is another query. Step S419 queries whether adjustments should be made to compensate for any discrepancies between the measured characteristics of the calibration patches and the reference calibration image. If the answer to the query of step S419 is "yes," then the next step is that of S421 which is to make the adjustments. The step following step S421 is the step S423 which is the end of the flow diagram 400. If the answer to step S419 is "no," then the flow diagram leads from step S419 directly to step S423, bypassing step S421.

It should be appreciated that the flow diagram 400 depicts but one possible embodiment of an algorithm that can be used to implement the method of the present invention, and that other algorithms can be used to equal effect, which are all in accordance with the above and following description.

In accordance with a fourth embodiment of the present invention, a method of calibrating a four-color image-producing apparatus having a movable surface is provided. The method can include defining an inter-page gap on the surface. Defining the inter-page gap can include calculating the size of the inter-page gap based on the length of the surface and the length of at least one output image to be produced thereon. Defining the inter-page gap can also include causing two consecutive output images to be produced on the surface at given times so as to dictate the size of the inter-page gap between the two images. A calibration algorithm can be provided which is used to define the inter-page gap.

The method further includes producing at least one calibration patch within an inter-page gap. The method can also include the step of defining the size of the inter-page gap so as to be in proportion to the number of calibration patches to be produced within the gap. The method can further include the step of defining a plurality of successive inter-page gaps and the step of producing at least one calibration patch within each of the plurality of successive inter-page gaps.

This can include producing, within each succeeding inter-page gap of the plurality of gaps, a greater number of calibration patches than in the preceding gap. It can also include producing, within each succeeding inter-page gap of the plurality of gaps, a smaller number of calibration patches than in the preceding gap. The step of producing at least one calibration patch within each of the plurality of succeeding inter-page gaps can include producing the same number of calibration patches within each of the plurality of gaps.

The method can also include producing a plurality of calibration patches within an inter-page gap, wherein all the calibration patches within the gap comprise the same toner. This can include producing a plurality of calibration patches within an inter-page gap, wherein all the calibration patches comprise the same toner and each is a different color density. The method can further include producing at least one calibration patch within each of a plurality of successive inter-page gaps, wherein all of the calibration patches within the plurality of successive inter-page gaps are of different color densities of the same color toner.

The method of calibration in accordance with the fourth embodiment of the present invention can also include producing a given number of calibration patches within an inter-page gap, or within several inter-page gaps. This can include producing a given sequence of calibration patches within at least one inter-page gap in which sequence each calibration patch has a unique combination of toner color and color density.

For example, a calibration method can include producing a first plurality of calibration patches within a first inter-page gap, each comprising only a first toner, and wherein each of the first plurality of calibration patches has a unique color density. In accordance with the method, the surface can be configured as an endless, revolvable belt, such as in the case of an intermediate transfer device. Alternatively, and also in accordance with the method, the surface can be configured as a rotatable drum, such as in the case of a photoconductor.

The calibration method can also include, for example, producing a second plurality of calibration patches within a second inter-page gap, each comprising only a second toner, and wherein each of the second plurality of calibration patches has a unique color density. The calibration method can include producing a plurality of calibration patches for each toner in a like manner.

The calibration method can further include producing at least one of the calibration patches within an inter-page gap. If additional inter-page gaps are unavailable due to the lack of output images after production of the given sequence of calibration patches is commenced but not completed, the method can include suspending the production of the given sequence of calibration patches until more inter-page gaps become available due to the production of additional output images.

Alternatively, if additional inter-page gaps are unavailable after production of the given sequence is commenced but not completed, the method can include aborting the production of the given sequence of calibration patches. This can include setting a timer and aborting the production of the given sequence of calibration patches, as well as dumping any detected and measured characteristics of the calibration patches, when the timer reaches a given time limit.

For example, if a given sequence of calibration patches has not been completed within a time limit of ten (10) minutes, the production of the given sequence of calibration patches can be aborted and any data relating to the detected and measured characteristics of the calibration patches can be dumped. The method then can include restarting the production of the given sequence of the calibration patches when additional inter-page gaps become available. In a related vein, the method can include surveying incoming output image data and ensuring that sufficient inter-page gaps will be available for the production of the entire sequence of calibration patches.

The method can further include producing a sequence of related calibration patches on the surface. At least one of the sequence of calibration patches can be produced within an inter-page gap. Also, at least one of the sequence of calibration patches can be produced outside of an inter-page gap and while the printer apparatus is idle. By "idle" I mean a status of the printer apparatus in which no inter-page gap exists on the surface.

An idle status can be caused by any of several possible reasons. One such reason is that no output image data is being sent to the printer apparatus. That is, no output images are being sent to the apparatus for printing. Another reason for an idle status is that image data for a relatively complex output image is being transmitted to the apparatus, and which data requires a relatively long period of time to transmit.

In accordance with a fifth embodiment of the present invention, another method of calibrating a four-color image-producing apparatus having a movable surface is provided. In the following discussion we will at times refer to a "first toner" applied to the surface, a "second toner applied", and so on. However, this should in no way be understood as associating the "first", "second", and so on toners with any particular toner identification, such as toner color and the like. The method in accordance with the fourth embodiment of the present invention can include providing an algorithm and can also include defining an inter-page gap by calculating the size of the gap based on the length of the surface and the length of a sheet of finished product medium onto which a given output image is to be transferred.

The method can also include producing a single output image on the surface, wherein the output image resides wholly on the surface and comprises a first color plane comprising a first toner. The method also can include producing at least one first calibration patch within an inter-page gap that is located between the ends of the single output image, which includes a single color plane. Each of the at least one first calibration patches can be of a different color density. Detecting and measuring at least one characteristic of at least one of the at least one first output images can be performed.

The method can include selectively removing the at least one first calibration patch from the inter-page gap during a first revolution of the surface while leaving the output image thereon. This can also include producing the output image and the at least one first calibration patch within the inter-page gap, wherein the output image is a color plane that comprises a first toner, and wherein the at least one first calibration patch comprises the first toner.

The method can further include adding a second color plane comprising a second toner to the surface and in substantial registration with the first color plane on a second revolution of the surface, and producing at least one second calibration patch within the inter-page gap, wherein the at least one second calibration patch comprises the second toner. Each of the at least on second calibration patches can be of a different color density. Detecting and measuring at least one characteristic of at least one of the at least one second output images can be performed. Selectively removing the at least one second calibration patch from the inter-page gap during the second revolution of the surface while leaving the output image thereon can be performed.

Similarly, the method can include adding a third color plane comprising a third toner to the surface and in substantial registration with the first and second color planes on a third revolution of the surface. The method can further include producing at least one third calibration patch within the inter-page gap during the third revolution of the surface, wherein the at least one third calibration patch comprises the third toner.

Each of the third calibration patches can be of a different color density. Detecting and measuring at least one characteristic of at least one of the third calibration patches can be performed. Likewise, selectively removing the at least one of the third calibration patches from the inter-page gap during the third revolution of the surface while leaving the output image thereon can be performed as well.

During a fourth revolution of the surface, adding a fourth color plane comprising a fourth toner to the first, second, and third color planes can be performed. The method can also include producing at least one fourth calibration patch within the inter-page gap, wherein the fourth calibration patch comprises the fourth toner. Each of the fourth calibration patches can be of a different color density.

Detecting and measuring at least one characteristic of at least one of the fourth calibration patches can be performed. Removing at least one of the fourth calibration patches can be performed also during the fourth revolution of the surface. Each of the first, second, third, and fourth toners can comprise one each of the colors black, yellow, cyan, and magenta. In accordance with the method, the surface can be configured as an endless, revolvable belt or, in the alternative, as a rotatable drum.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of calibrating an image-producing device, the image-producing device having an intermediate transfer device, the method comprising:

producing an output image on the intermediate transfer device during a first revolution thereof, wherein the output image comprises a first toner; and, producing at least one first calibration patch within an inter-page gap on the intermediate transfer device during the first revolution thereof, wherein the at least one first calibration patch comprises the first toner;

removing the at least one first calibration patch from the intermediate transfer device during the first revolution thereof;

adding a second toner to the output image during a second revolution of the intermediate transfer device;

producing at least one second calibration patch within the inter-page gap on the intermediate transfer device during the second revolution thereof, wherein the at least one second calibration patch comprises the second toner; and, removing the at least one second calibration patch from the intermediate transfer device during the second revolution thereof.

2. The method of claim 1, and further comprising:

adding a third toner to the output image on a third revolution of the intermediate transfer device;

producing at least one third calibration patch within the inter-page gap on the intermediate transfer device during the third revolution thereof, wherein the at least one third calibration patch comprises the third toner; and, removing the at least one third calibration patch from the intermediate transfer device during the third revolution thereof.

3. The method of claim 2, and further comprising:

adding a fourth toner to the output image on a fourth revolution of the intermediate transfer device;

producing at least one fourth calibration patch within the inter-page gap on the intermediate transfer device during the fourth revolution thereof, wherein the at least on fourth calibration patch comprises the fourth toner; and, removing the at least one fourth calibration patch from the intermediate transfer device during the fourth revolution thereof.

4. The method of claim 3, and wherein each of the first, second, third, and fourth toners comprises one each of the colors black, yellow, cyan, and magenta.

5. An image producing apparatus, comprising:

an intermediate transfer device;

an image-producing portion which is configured to produce at least one calibration patch on the intermediate transfer device;

a calibration algorithm configured to cause the image-producing portion to produce at least one calibration patch within an inter-page gap; and, a cleaning station which is configured to selectively remove at least one calibration patch from within the inter-page gap during a given revolution of the intermediate transfer device, to the exclusion of the removal of any toner residing outside the interpage gap on the intermediate transfer device during the given revolution.

* * * * *

UNITED STATES PATENT AND TRADEMARK OFFICE
CERTIFICATE OF CORRECTION

PATENT NO.     : 6,519,425 B2                                           Page 1 of 1
DATED          : February 11, 2003
INVENTOR(S)    : Fischer It is certified that error appears in the above-identified patent and that said Letters Patent is hereby corrected as shown below:

Column 7,
Line 13, before "device," insert -- After the image has been completed with all four color planes on the intermediate transfer --.

Signed and Sealed this

Seventeenth Day of February, 2004

JON W. DUDAS
*Acting Director of the United States Patent and Trademark Office*